F. P. KITTREDGE.
LATHE ATTACHMENT.
APPLICATION FILED JAN. 30, 1917.

1,267,083.

Patented May 21, 1918.

Inventor
Frank P. Kittredge
By Harvell & Harvell
Attorneys

UNITED STATES PATENT OFFICE.

FRANK P. KITTREDGE, OF MILO, MAINE.

LATHE ATTACHMENT.

1,267,083.  Specification of Letters Patent.  Patented May 21, 1918.

Application filed January 30, 1917. Serial No. 145,363.

*To all whom it may concern:*

Be it known that I, FRANK P. KITTREDGE, a citizen of the United States, residing at Milo, in the county of Piscataquis and State of Maine, have invented new and useful Improvements in Lathe Attachments, of which the following is a specification.

The invention relates particularly to ball bearing heads for tail stock spindles of wood turning lathes, though capable of use on lathes generally in any serviceable capacity in connection therewith.

Objects of the invention will be brought out in the following detailed description taken in conjunction with the accompanying drawing in which latter like characters of reference designate similar parts throughout the several views.

Figure 1:
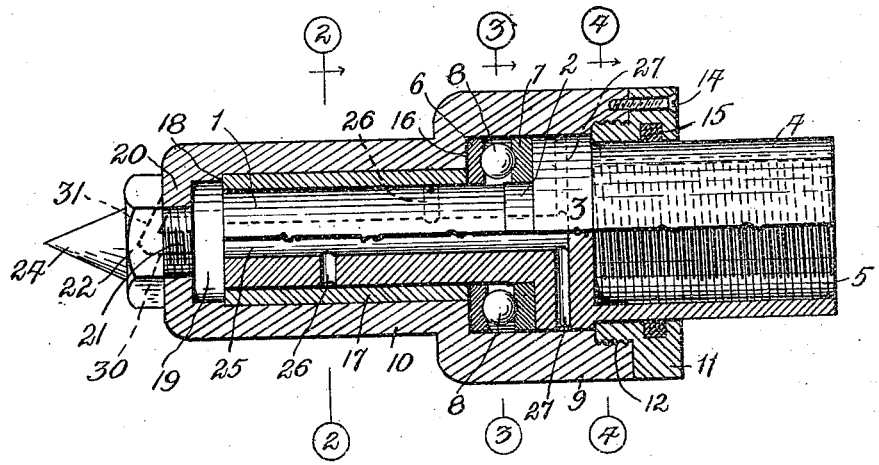

Figure 1 is a vertical longitudinal sectional view taken through the complete invention, with spindle parts shown in elevation.

Figure 2:
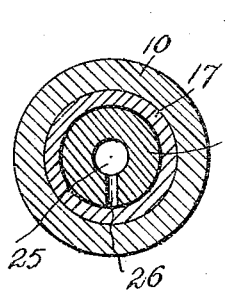
Figure 3:
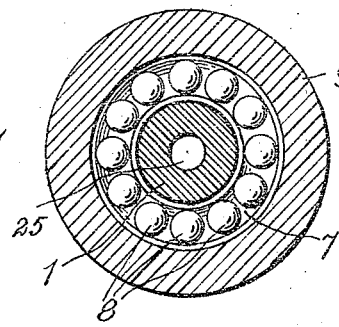
Figure 4:
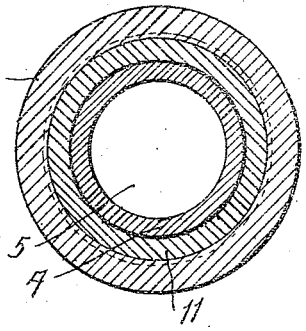
Figure 5:
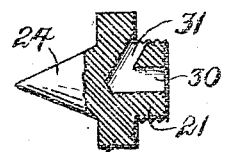

Fig. 2 is a transverse vertical sectional view taken through line 2—2 of Fig. 1, Fig. 3 is a transverse sectional view taken through line 3—3 of Fig. 1, Fig. 4 is a transverse sectional view taken through line 4—4 of Fig. 1, and Fig. 5 is a detail view of the spur, with parts broken away and shown in section.

Referring more particularly to the drawing, reference character 1 designates a spindle portion, slightly larger in diameter at its inner end 2, and provided adjacent to such portion 2 with a collar 3, from which, on the opposite side from portion 1, extends a sleeve 4. This sleeve is bored and tapped out as at 5 to fit any lathe tail stock which will, or may be modified to, receive it. A thrust bearing comprising bearing plates or rings 6 and 7 surround the spindle and receive between them and in race ways therein a plurality of balls 8, which may or may not as elected, be held in spaced or spaced retained relation by the ordinary and well known retainer, not shown.

An outside shell comprising comparatively large and reduced parts 9 and 10 respectively incloses the aforementioned parts, with a washer 11 tapped thereinto as indicated at 12 and held from unscrewing by means of a lock screw 14 passing through the washer and into the said outer shell. This washer has a loose running fit with the said sleeve 4 and is grooved internally to receive a felt packing ring 15, which latter serves to retain the lubricant, to be hereinafter referred to more fully, within the device. This washer 11 also engages in a loose running fit, with one face of the spindle collar 3, preventing thrust and displacement of the spindle in the direction of said washer end of the device.

Where the reduced and enlarged portions of the outer shell meet, an internal shoulder 16 is provided and between this shoulder and the inner face of the collar 3, the said thrust bearing is confined, the thrust ring 6 abutting said shoulder 16 and the other thrust ring 7 abutting the inner face of the said collar 3 and having a driving fit on the slightly enlarged spindle portion 2, while the thrust ring 6 has a loose running fit on the spindle portion 1 and also with the outer shell. The thrust bearing parts and the spindle collar 3 being confined between the washer 11 and shoulder 16, prevent displacement or endwise movement of the spindle or outer shell relatively, and the washer being removable permits of ready removal and repair or replacement of the interior parts. Within the reduced portion 10 of the outer shell is arranged, preferably with a driving fit, a bearing bushing 17, one end thereof being coincident with the shoulder 16 and forming an abutment therewith for the thrust bearing ring 6, and the other end of the bushing abutting a shoulder 18 interiorly of the shell portion 10. A lubricant receiving space 19 is provided between the end of the spindle portion 1 (and also of the bushing 17) and the closed end 20 of the shell portion 10, to which lubricant may be admitted upon removal of a screw plug 21 threaded into said closed end portion 20. This screw plug 21 is provided with a nut head 22, upon which is provided the spur 24 to engage with the work, said spur being of any desired type.

The lubricant finds its way through a passage 25 bored longitudinally for a distance in the spindle, and is distributed to the bearing faces between spindle portion 1 and the bushing 17 by means of radial passages 26. Similar radial passages 27 are provided in the collar 3 to distribute lubricant from the passage 25 to the opposed surfaces of the said collar 3 and portion 9 of the outer shell. The spur member is provided with a passage 30 bored through portion 21 and partially into nut portion 22 axially, and with an angular passage 31 leading into said passage 30 from a point where the inner face of nut portion 22 joins the outer threaded portion of said portion 21. When lubricant is to be admitted to the interior of the device, the spur is partially unscrewed to expose the passage 31, into which the lubricant is fed, and when the spur is again screwed home, the nut portion 22 engaging the closed end 20 of the shell, completely closes said passage 31 against leakage of lubricant and entry of dust and dirt.

What is claimed is:

The combination of a spindle, a lubricant-containing shell rotatable upon the spindle and having a threaded aperture in its forward end, an anti-friction bearing contained in the shell and interposed between the same and the spindle, and a combined spur and closure plug; said spur and plug having a threaded portion movable in said threaded aperture and also having a lubricant passage communicating with the shell interior and arranged to be exposed when the combined spur and plug is screwed outwardly, and closed when said spur and plug is screwed inwardly.

In testimony whereof I have hereunto set my hand in presence of two subscribing witnesses.

FRANK P. KITTREDGE.

Witnesses:
OSCAR F. DEGERSTONS,
JOSIAH F. DAVIS.

Copies of this patent may be obtained for five cents each, by addressing the "Commissioner of Patents, Washington, D. C."